No. 611,500. Patented Sept. 27, 1898.
S. G. MILLS.
CHURN.
(Application filed Dec. 6, 1897.)
(No Model.)

Witnesses
Wm H. Edwards Jr.
J. W. Mothershead

Stephen G. Mills
Inventor
By Edson Bros.
Attorneys

UNITED STATES PATENT OFFICE.

STEPHEN G. MILLS, OF WICHITA, KANSAS.

CHURN.

SPECIFICATION forming part of Letters Patent No. 611,500, dated September 27, 1898.

Application filed December 6, 1897. Serial No. 660,946. (No model.)

*To all whom it may concern:*

Be it known that I, STEPHEN G. MILLS, a citizen of the United States, residing at Wichita, in the county of Sedgwick and State of Kansas, have invented certain new and useful Improvements in Churns; and I do hereby declare the following to be a full, clear, and exact description of the invention, such as will enable others skilled in the art to which it appertains to make and use the same.

My invention relates to improvements in churns, particularly that class employing a vertical rotary dasher and a stationary body.

It has for its object, among other things, to effect the thorough and ready conversion of the cream with the minimum expenditure of power. It acts to throw the cream downward and form the butter upon the bottom of the receptacle; also, to throw the contents thereof away from the sides of the receptacle toward the center, desiderata in the operation of churning or making butter in that the butter can be readily collected or removed and the buttermilk drawn off.

To these ends the invention consists, chiefly, in the detailed construction more especially of the dasher and in the construction, combination, and arrangement of certain other parts, substantially as hereinafter more fully disclosed, and specifically pointed out in the claims.

In the embodiment of my invention I construct the dasher with a series of marginal oppositely-deflected or angular flanges or offsets; also, with an intermediary series of similarly-arranged flanges or offsets projecting from the dasher on opposite sides of its staff or shaft, said flanges or offsets being peculiarly relatively disposed; also, the gear-shifting device or contrivance for throwing the dasher in and out of operation is adapted to effect the same with facility; also, the lid, together with the body of the churn, is adapted to be held, by means described later on, firmly in place during the churning operation.

Figure 1:
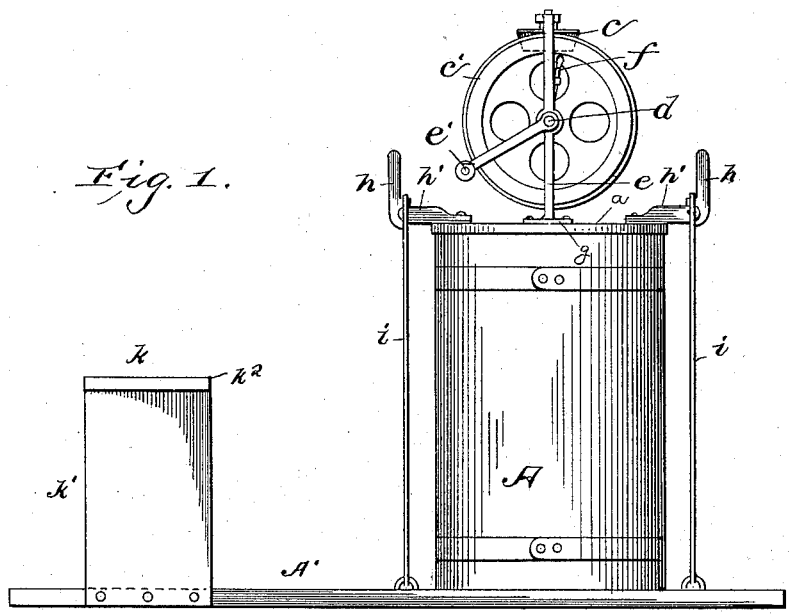
Figure 2:
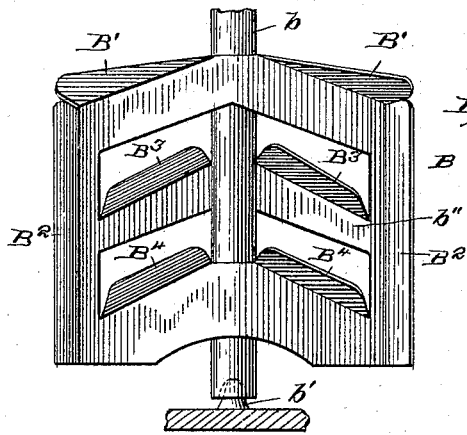
Figure 3:
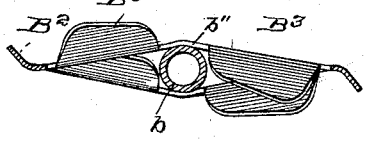
Figure 4:
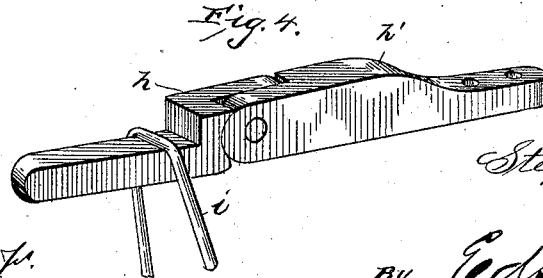

In the accompanying drawings, illustrating the preferred form of carrying out my invention, Figure 1 is an elevation showing my invention as assembled for use. Fig. 2 is a side view of the dasher. Fig. 3 is a cross-section, and Fig. 4 is a perspective view of the cam-lever.

Latitude will be allowed in regard to the various details, as these may be changed without departing from the spirit of the invention and the same yet remain intact.

A refers to the body or receptacle of suitable construction to contain the cream for conversion, and $a$ refers to its lid or cover.

B is the dasher, arranged in the receptacle or body A with its staff or shaft $b$ suitably stepped or journaled at its lower end upon a pivot or pin $b'$ in the center of the bottom of said receptacle and its upper portion passing through a suitable opening in the lid or cover $a$. The extreme upper end of said dasher staff or shaft has secured thereon a beveled pinion $c$, with which gears a larger similar cog-wheel $c'$, feathered upon a horizontal shaft $d$, supported in a suitable frame $e$, secured upon the lid or cover $a$ and having a handle or crank $e'$ at one end. The wheel $c'$ is adapted to be shifted into and out of gear with the pinion $c$, according as it is desired to throw the dasher into or out of operation, by means of the shipping-lever $f$, suitably connected to the frame $e$ and adapted to engage the hub of the wheel $c'$. The frame $e$ is held upon the lid or cover $a$ by a preferably lozenge-shaped plate $g$, bolted or fastened to said lid or cover.

The dasher B itself is preferably produced or formed in a single piece from sheet metal, and at its top and lateral edges or margins with a series of angular offsets or flanges B' B² and with intermediary series of offsets or flanges B³ B⁴. The marginal series of offsets or flanges are so arranged that the lateral flanges are deflected in opposite directions at about an angle of forty-five degrees from the body of the dasher, while the top flanges or offsets are similarly deflected at about the same angle from the body of the dasher at opposite sides of the staff to act upon and throw the cream from the sides of the receptacle A toward the center as the dasher is rotated. The intermediary series of flanges or offsets B² also stand at the same angle from the body of the dasher and are so arranged that diagonally opposite flanges, consequently those in the same general vertical plane, project in opposite directions from the body of the dasher and at opposite sides of the staff. This arrangement and angularity of the flanges or offsets provide for precipitating or throwing the cream downward, as the dasher is revolved, in its conversion into butter and for effecting that result quickly and with the expenditure of the minimum power. As before also stated, the butter is thus formed on the bottom of the cream-receptacle, whence it can be readily removed and the buttermilk readily drawn off. The dasher itself is also made or stamped up in skeleton form, with each of the intermediary rib-like cross-pieces $b''$ thus formed produced with oppositely-inclined longitudinal edges, the meeting-points or apices thereof being central of the dasher, while said ribs or cross-pieces themselves are alternately bowed or deflected laterally from their ends toward their mid-lengths, the function of which is twofold. First, the flanges or offsets are adapted to set at relatively opposite inclinations sloping downward away from opposite sides of the shaft or staff to throw the cream also inward or toward the center as well as downward, and, second, the offsets or flanges are adapted to alternate with each other upon each side of a central line of the shaft, allowing the flanges or offsets to act alternately upon the cream globules, in addition to providing for the more advantageous arrangement and securing of the shaft to the dasher, as will be readily appreciated. Also the top flanges or offsets of the dasher flare outward toward and a short distance beyond and meet the lateral flanges or offsets at their top edges, thus aiding to more effectually throw the cream-globules downward to the bottom of the receptacle.

The lid or cover and the cream-receptacle are adapted to be held firmly in position during the churning operation by means of cam-levers $h$, pivoted to and interacting or interlocking with bars $h'$, secured to the lid or cover, and bands or straps $i$, suitably secured to the base-piece supporting the cream-receptacle and looped over said cam-levers, the latter being thrown up to tighten said bands and to be automatically locked into position, as will be readily seen.

A seat $k$ for the operator may be improvised of vertical pieces $k'$, suitably secured upon said receptacle-base, and a horizontal board $k^2$ placed across said vertical pieces.

Having thus fully described my invention, what I claim, and desire to secure by Letters Patent, is—

1. In a churn, the dasher having a series of lateral oppositely-extending flanges, the series of top oppositely-arranged flanges, and the two series of intermediary oppositely-projecting flanges inclined from the center downward, to throw the cream to the bottom and to provide for the collecting of the buttermilk thereon, substantially as set forth.

2. In a churn, the dasher having the series of lateral oppositely-extending flanges, the series of top oppositely-arranged flanges, and the two series of intermediary oppositely-projecting flanges inclined from the center downward, said series of intermediary flanges and said top series of flanges being bowed or flexed laterally in opposite directions, respectively, the maximum divergence between said flanges being adapted to provide for the reception between them of the dasher staff or shaft, and its attachment thereto, substantially as set forth.

In testimony whereof I affix my signature in presence of two witnesses.

STEPHEN G. MILLS.

Witnesses:
M. M. McCOLLISTER,
THOS. C. MIRLON.